No. 886,098. PATENTED APR. 28, 1908.
W. W. WAINWRIGHT.
MOTOR VEHICLE.
APPLICATION FILED MAR. 7, 1907.
2 SHEETS—SHEET 1.
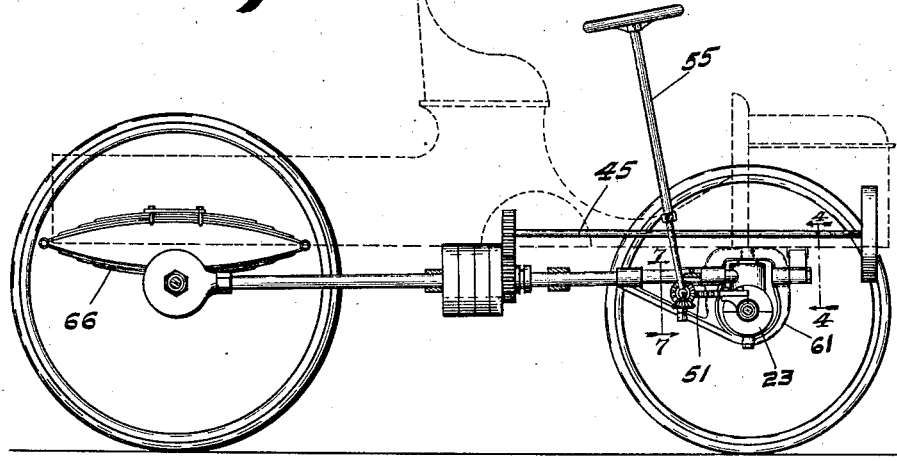
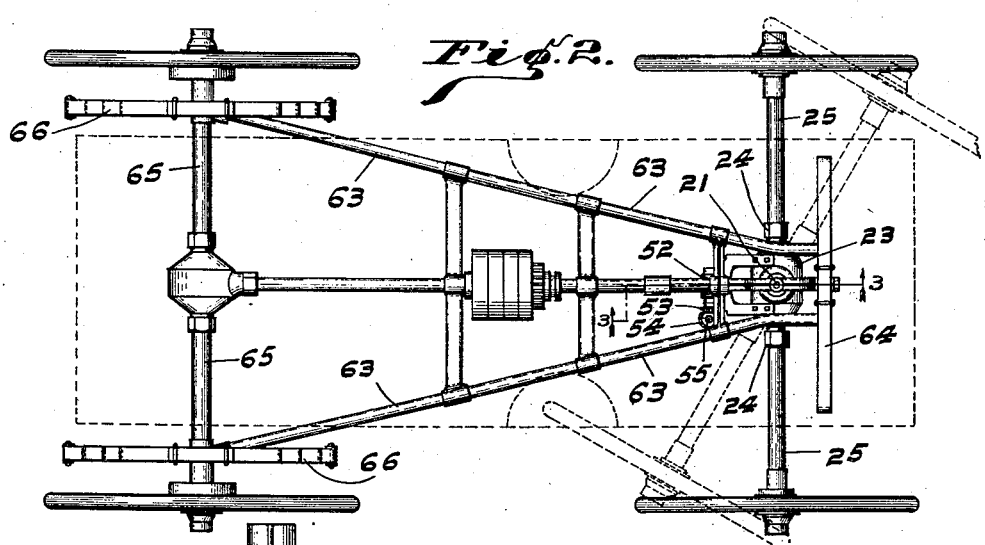
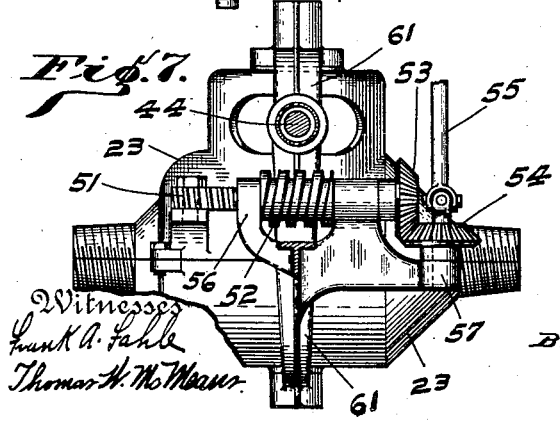
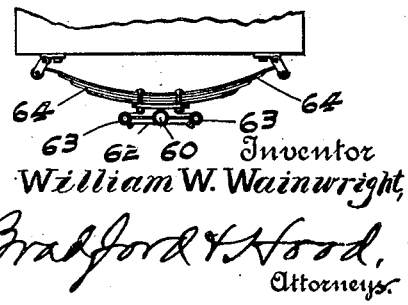
Witnesses
Frank A. Fahle
Thomas W. McMeans
Inventor
William W. Wainwright,
BY Bradford & Hood,
Attorneys.

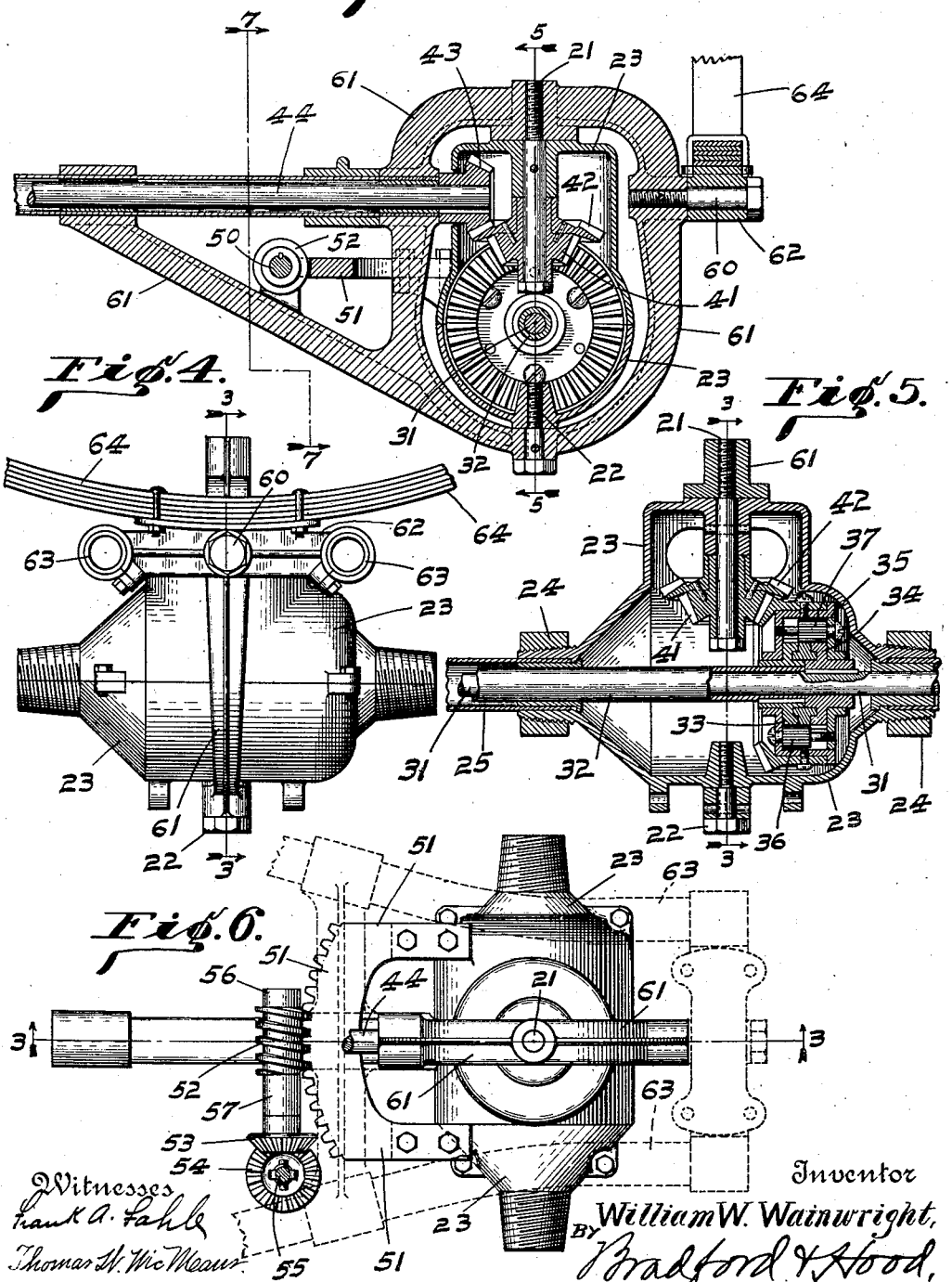

UNITED STATES PATENT OFFICE.

WILLIAM W. WAINWRIGHT, OF CONNERSVILLE, INDIANA.

MOTOR-VEHICLE.

No. 886,098.  Specification of Letters Patent.  Patented April 28, 1908.

Application filed March 7, 1907. Serial No. 361,089.

*To all whom it may concern:*

Be it known that I, WILLIAM W. WAINWRIGHT, a citizen of the United States, residing at Connersville, in the county of Fayette and State of Indiana, have invented certain new and useful Improvements in Motor-Vehicles, of which the following is a specification.

My present invention relates to that class of motor vehicles wherein the driving power is applied to both the front and the rear axles.

Said invention consists in certain improvements in the construction and arrangement of parts embodied in such a vehicle, as will be hereinafter more particularly described and claimed.

Referring to the accompanying drawings, which are made a part hereof, and on which similar reference characters indicate similar parts, Figure 1 is a side elevation of so much of the running gear of a motor vehicle of the character in question as embodies my present invention, the position of the body thereon being indicated by means of dotted lines; Fig. 2 a top or plan view of such a running gear; Fig. 3 a detail vertical sectional view on an enlarged scale, as seen when looking in the direction indicated by the arrows from the dotted line 3 3 in Figs. 2, 4, 5 and 6; Fig. 4 a detail front elevation of the parts shown in Fig. 3, as seen when looking in the direction indicated by the arrows from the dotted line 4 4 in Fig. 1; Fig. 5 a central vertical sectional view at the point indicated by the dotted line 5 5 in Fig. 3; Fig. 6 a top or plan view of the parts shown in Fig. 3, with a part of the shaft broken away better to show the steering gear;—the position of the frame relatively thereto being indicated by dotted lines; Fig. 7 a detail view as seen when looking in the direction indicated by the arrows from the dotted line 7 7 in Figs. 1 and 3, and Fig. 8 a detail elevation showing the spring attachment partially shown in Fig. 4, but on a smaller scale.

In a motor vehicle of this character all the wheels are positively driven.

My present invention relates particularly to the means for driving and steering the front axle. Said axle and its attached parts may swing (as indicated in Fig. 2) about a vertical axis at the point of pin 21. This pin 21 and its mate 22 support a shell 23 which forms a part of the front axle structure; or, rather, of the inclosing casing in which the front axle proper runs. This casing is composed of two parts, as shown; and the structure is tubular at its ends and is exteriorly threaded and said ends are tapered slightly at the points where threaded. They are held together at these threaded points by suitable nuts 24 which are likewise slightly tapered. By means of these the two parts are drawn together very tightly, so as to make the inclosure liquid tight. Continuing each way from this central structure are tubes 25 which inclose the axle proper, and extend between said structure and the wheels.

The front axle proper is composed of two parts 31 and 32 which are sleeved together. At the point where the tubular portion 32 terminates it bears a spur gear 33, and adjacent thereto on the axle 31 is a similar spur gear 34. Surrounding these two spur gears is a housing 35 which carries two pinions 36 and 37 one of which is in engagement with the spur gear 33 and the other of which is in engagement with the spur gear 34. As the ends of the axle advance and recede relatively to each other, these gears operate as an equalizing connection between the two axle parts, compelling an equal number of rotations of said two parts, generally speaking, but permitting them to move with relatively differing speeds, as the axle carrying them swings on its vertical pivot, during the operation of steering.

The housing 35 embodies a bevel gear by which the whole structure is driven from a bevel pinion 41, which is mounted on a shaft formed by a prolongation of the pivot pin 21. Another bevel gear 42 on this same shaft engages with a bevel pinion 43 on the main driving shaft 44. This driving shaft is propelled from the engine shaft 45.

Secured to the structure 23 is a segment 51. A suitable worm gear 52 engages with this segment and is adapted to be operated by a pinion 53 on the same shaft therewith, and a corresponding bevel pinion 54 on an ordinary steering shaft 55. The screw shaft is mounted in suitable bearings 56 and 57 on an arm of the main frame bracket which will now be described.

The pivot pins 21 and 22, and the shaft 44, the worm shaft 50, and also a stud or pivot shaft 60 have their bearings in a main bracket 61. This bracket is connected by the stud shaft 60 through a cross head or front frame member 62 to the side bars 63 of the running gear frame or motor-carrying frame upon which the engine and other parts of the vehicle are mounted. This bracket not only supports these various parts, but holds them strongly into the proper relative positions. Upon the member 62 is also a suitable saddle or seat for the spring 64. The frame side bars 63 extend back to and connect with the casing 65 which surrounds the rear axle. Said casing 65, side bars 63 and front member 62, together with suitable cross bars, constitute the motor-carrying frame of the vehicle, and this frame carries also the springs 64 and 66, upon which the body of the vehicle is mounted. As will be noticed, the yoke 61 in which the shell or casing 23 is mounted, is pivotally connected to the member 62 of the frame, so that the varying positions of the wheels, as they pass over uneven surfaces, will have no twisting effect on said frame, or on the driving mechanism—the axis of the pivotal connection being in line with the axis of the driving shaft 44.

Having thus fully described my said invention, what I claim as new, and desire to secure by Letters Patent, is—

1. In a motor vehicle, the combination, of a hollow steering axle-structure, a pair of live shafts mounted in said structure and connected at their inner ends by a compensating gear also mounted within the structure, a driving pinion structure journaled within the hollow axle-structure and meshing with the compensating gear, a frame yoke pivotally mounted exteriorly upon the axle-structure on an axis at right angles to the axis of the axle-structure, a driving shaft journaled in said yoke, a pinion meshing with the driving pinion-structure, the axle-structure having a substantially horizontal opening permitting the engagement of the driving shaft pinion with the driving pinion-structure, and means for swinging said axle-structure in the yoke upon the pivotal connection therebetween.

2. In a motor vehicle, the combination, of a hollow steering axle-structure, a pair of live shafts mounted in said structure and connected at their inner ends by a compensating gear also mounted within the structure, a driving pinion structure journaled within the hollow axle-structure and meshing with the compensating gear, a frame yoke pivotally mounted exteriorly upon the axle-structure on an axis at right angles to the axis of the axle-structure, a driving shaft journaled in said yoke, a pinion arranged within the axle-structure and meshing with the driving pinion structure, the axle-structure having a substantially horizontal opening permitting the engagement of the driving shaft pinion with the driving pinion structure, and means for swinging said axle structure in the yoke upon the pivotal connection therebetween.

3. In a motor vehicle, the combination, of a hollow axle structure having a pair of live shafts journaled therein, a compensating gear also mounted within said structure and connecting the inner ends of the live shafts, a stud shaft mounted in said axle-structure at right angles to the live shafts, a pair of connected pinions journaled on said stud within the axle-structure, one of said pinions meshing with the compensating gear, a frame yoke pivoted exteriorly upon the axle-structure on an axis coincident with the axis of the stud, a driving shaft journaled in said yoke and projected through a substantially horizontal slot into the axle-structure, a pinion carried by said shaft and meshing with the corresponding pinion journaled upon the stud, and means for swinging the axle-structure within the yoke.

4. The combination, in a motor-vehicle, with an axle and the gear for driving said axle, of a shell surrounding the same and composed of two parts, the ends whereof which are immediately adjacent to the axle being tapered slightly and exteriorly threaded, and nuts upon said threaded portions, whereby by screwing up said nuts the two halves of said shell will be forced tightly together.

5. In a motor vehicle, the combination, of a hollow axle-structure having a pair of live shafts journaled therein, a compensating gear also mounted within said structure and connecting the inner ends of the live shafts, a stud shaft mounted in said axle-structure at right angles to the live shafts, a pair of connected pinions journaled on said stud within the axle-structure, one of said pinions meshing with the compensating gear, a frame yoke pivoted exteriorly upon the axle-structure on an axis coincident with the axis of the stud, a driving shaft journaled in said yoke and projected through a substantially horizontal slot into the axle-structure, a pinion carried by said shaft and meshing with the corresponding pinion journaled upon the stud, a segment carried by the axle-structure, a worm journaled upon the yoke and meshing with said segment, and means for rotating said worm.

In testimony whereof, I have hereunto set my hand and seal at Indianapolis, Indiana, this twenty-seventh day of February, A. D. one thousand nine hundred and seven.

WILLIAM W. WAINWRIGHT. [L. S.]

Witnesses:
 CHESTER BRADFORD,
 THOMAS W. MCMEANS.